United States Patent [19]
Gebelein

[11] Patent Number: 4,718,753
[45] Date of Patent: Jan. 12, 1988

[54] TELESCOPE WITH CORRECTING LENS

[76] Inventor: Rolin J. Gebelein, 291 Martin, Santa Cruz, Calif. 95060

[21] Appl. No.: 782,286

[22] Filed: Sep. 30, 1985

Related U.S. Application Data

[60] Continuation-in-part of Ser. No. 660,916, Oct. 15, 1984, Pat. No. 4,571,036, which is a division of Ser. No. 316,134, Nov. 22, 1981, Pat. No. 4,477,156.

[51] Int. Cl.$^4$ .......................... G02B 17/08; G02B 9/10
[52] U.S. Cl. .................................... 350/503; 350/442; 350/479
[58] Field of Search ............................. 350/503–505, 350/442–444, 435, 479, 453, 537

[56] References Cited

U.S. PATENT DOCUMENTS 3,180,217  4/1965  Argyle et al. ..................... 350/444
3,547,525  12/1970  Rayces et al. ..................... 350/444

FOREIGN PATENT DOCUMENTS 3060 of 1909  United Kingdom ................ 350/410
158698  10/1963  U.S.S.R. ............................ 350/443
197710  10/1977  U.S.S.R. ............................ 350/444

OTHER PUBLICATIONS

Harmer et al., "A Single-Lens, Small-Field, Paraboloid Field Corrector" the Observatory, 12-1976, pp. 239-241.
Maksutov, D. D., "New Catadioptric Meniscus Systems", Jr. Optical Soc. of America, 5-1944, pp. 270-284.
Willstrop, R. V., "A Simple Coma Corrector for Off-Axis Guiding", Mon. Not. R. Astr. Soc., vol. 191, 1980, pp. 777-783.

Primary Examiner—William H. Punter
Attorney, Agent, or Firm—Joseph H. Smith

[57] ABSTRACT

The present invention provides in one embodiment a Newtonian type reflecting telescope, preferably using a primary parabolic reflecting mirror, in which a meniscus lens is used to simultaneously correct for coma aberrations of both the primary reflector and of an eyepiece lens used for viewing the image, as well as for spherical aberration of the eyepiece. In some embodiments, the meniscus correcting lens is moveably mounted so that in one position it is used in connection with a viewing eyepiece, correcting the above-mentioned aberrations of primary reflector and eyepiece; while in a second position this same correcting lens is used with a lensless camera mounted on the telescope, in this case properly correcting the system only for the coma of the primary reflector. In all cases, the field of view, and magnification, of the telescope remains unchanged or only negligibly changed. In some additional embodiments, power is added to the meniscus lens to provide a new type of powered corrector. With this new corrector, a rather ordinary telescope, i.e., with an optically slow primary mirror as its objective, can be used in a dual mode, with bright, well corrected, wide field imagery at lower magnification with the corrector in the optical path, and in the ordinary higher power mode when the corrector is removed from the optical path.

4 Claims, 11 Drawing Figures

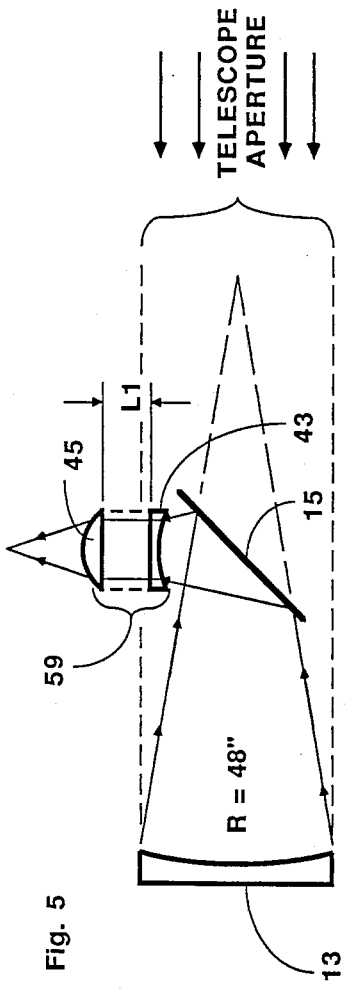
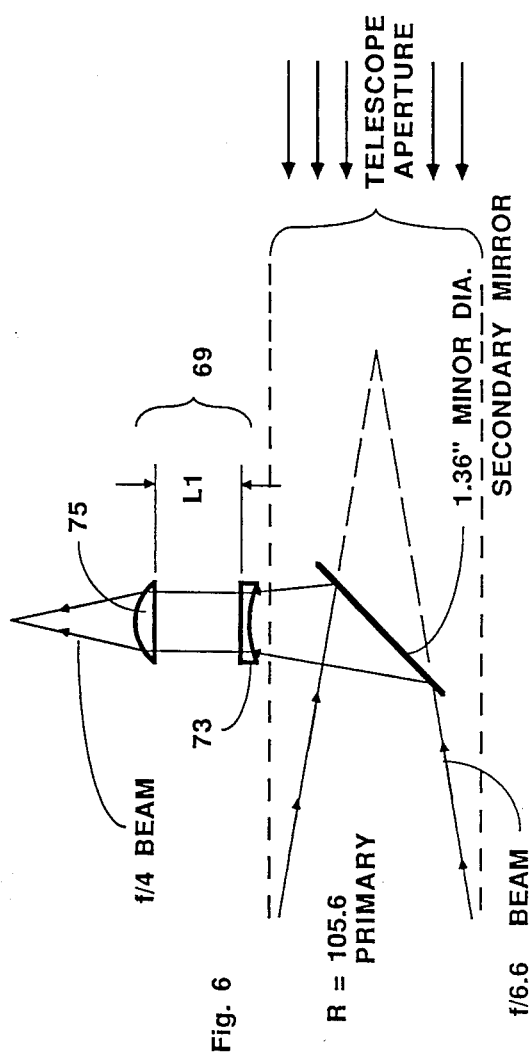

TELESCOPE WITH CORRECTING LENS

CROSS REFERENCE TO RELATED APPLICATION

This is a continuation-in-part application of application Ser. No. 660,916, filed Oct. 15, 1984, now issued as U.S. Pat. No. 4,571,036, which is a divisional of application Ser. No. 316,134, filed Nov. 22, 1981, now issued as U.S. Pat. No. 4,477,156,

BACKGROUND OF THE INVENTION

This invention is concerned generally with correction of aberrations associated with telescopes, and more particularly with a correcting lens which can be used to correct for spherical aberration, and coma, and in some cases astigmatism, and which at the same increases image brightness and contrast ratio.

A common telescope widely used by amateur astronomers and professional astronomers is the Newtonian reflecting telescope. In such telescopes a parabolic mirror is positioned at one end of a supporting tube to collect incoming light and focus that light to an image point whih can be examined by the viewer. Typically, the light is reflected by a small, flat mirror out to a region at the side of the tube, so that the image may be viewed through an eyepiece mounted at the side of the telescope tube. In recent years Newtonian telescopes of this type have become available with much larger apertures than heretofore. For example, telescopes with an aperture speed of f/2.9 are now commercially available. These fast Newtonian telescopes present aberration problems that were non-existent or less important with optically slower telescopes of this kind.

One aberration is "coma", an aberration which affects light rays off the optical axis of the telescope; in particular, stars which are off-axis take on the appearance of comets, having a tail extending outwardly from a central bright spot. A detailed discussion of the coma aberration for a spherical lens can be found in the textbook "Fundamentals of Optics" by Jenkins and White, published in 1957 by McGraw-Hill Book Company. An excellent discussion of the coma aberration of parabolic mirrors may be found in "Telescope Making" (ISS N 0190-5570), No. 9, Richard Berry, Editor; published in the Fall Quarter of 1980 by Astromedia Corporation. A discussion may also be found in the "Handbook of Military Infrared Technology," William L. Wolfe, Editor; published in 1965 by the Office of Naval Research Department of the Navy, Washington, D.C.

In addition to the problem of coma of the parabolic mirror, it has been found that the use of any eyepiece with the fast Newtonian telescopes generates additional aberrations by virtue of the eyepiece itself. These aberrations are both spherical aberration and coma. The resulting image quality is therefore greatly degraded.

A great body of literature exists concerning the correction of aberrations in lens and mirror systems of all kinds. In general, correction of aberrations involves the placing of a number of correcting lenses in the optical system, the various correcting lenses being designed to more or less cancel out the most objectionable aberrations of the other lenses in the system, including new aberrations introduced by the correcting lenses themselves.

A reference of particular interest with respect to the present invention is the paper entitled "New Catadioptric Meniscus Systems" by D. D. Maksutov, published in the *Journal of the Optical Society of America*, Volume 34, No. 5, May 1944. The Maksutov paper is largely concerned with the use of meniscus lenses to correct aberrations of spherical reflecting mirrors used in telescopes. The paper does not deal with correcting aberrations of parabolic reflectors, nor with correcting aberrations of both reflectors and viewing lenses (eyepieces) in a telescope.

Other references showing coma correction are: "Field Correctors for Large Telescopes," Applied Optics, September 1965, by C. G. Wynne; "Corrected Cassegrain System," Applied Optics, January 1964, by Seymore Rosin; and "Ritchey Chretian Corrector System," Applied Optics, April 1966 by Seymore Rosin.

SUMMARY OF THE INVENTION

In accordance with the illustrated preferred embodiments, the present invention provides in one embodiment a Newtonian type reflecting telescope, preferably using a primary parabolic reflecting mirror, in which a meniscus lens is used to simultaneously correct for coma aberrations of both the primary reflector and o an eyepiece lens used for viewing the image, as well as for spherical aberration of the eyepiece. In some embodiments, the meniscus correcting lens is moveably mounted so that in one position it is used in connection with a viewing eyepiece, correcting the above-mentioned aberrations of primary reflector and eyepiece; while in a second position this same correcting lens is used with a lensless camera mounted on the telescope, in this case properly correcting the system only for the coma of the primary reflector. In other embodiments the meniscus lens is formed from a plano-concave lens and a planoconvex lens positioned with their planar sides mutually parallel.

In all cases using a meniscus lens for the correction with each curved optical surface having the same radius of curvature, the field of view and magnification of the telescope remains substantially unchanged.

In some additional embodiments, power is added to the meniscus lens to provide a new type of powered corrector. With this new corrector, a rather ordinary telescope, ie., with an optically slow primary mirror as its objective, can be used in a dual mode, with bright, well corrected, wide field imagery at lower magnification with the corrector in the optical path, and in the ordinary higher power mode when the corrector is removed from the optical path.

DESCRIPTION OF THE DRAWINGS

FIG. 5 illustrates a standard Newtonian telescope design using a zero-power corrector assembly according to the invention.

FIG. 6 illustrates another embodiment of the invention where power is added to the corrector assembly.

DETAILED DESCRIPTION OF THE PREFERRED EMBODIMENT

Figure 1:
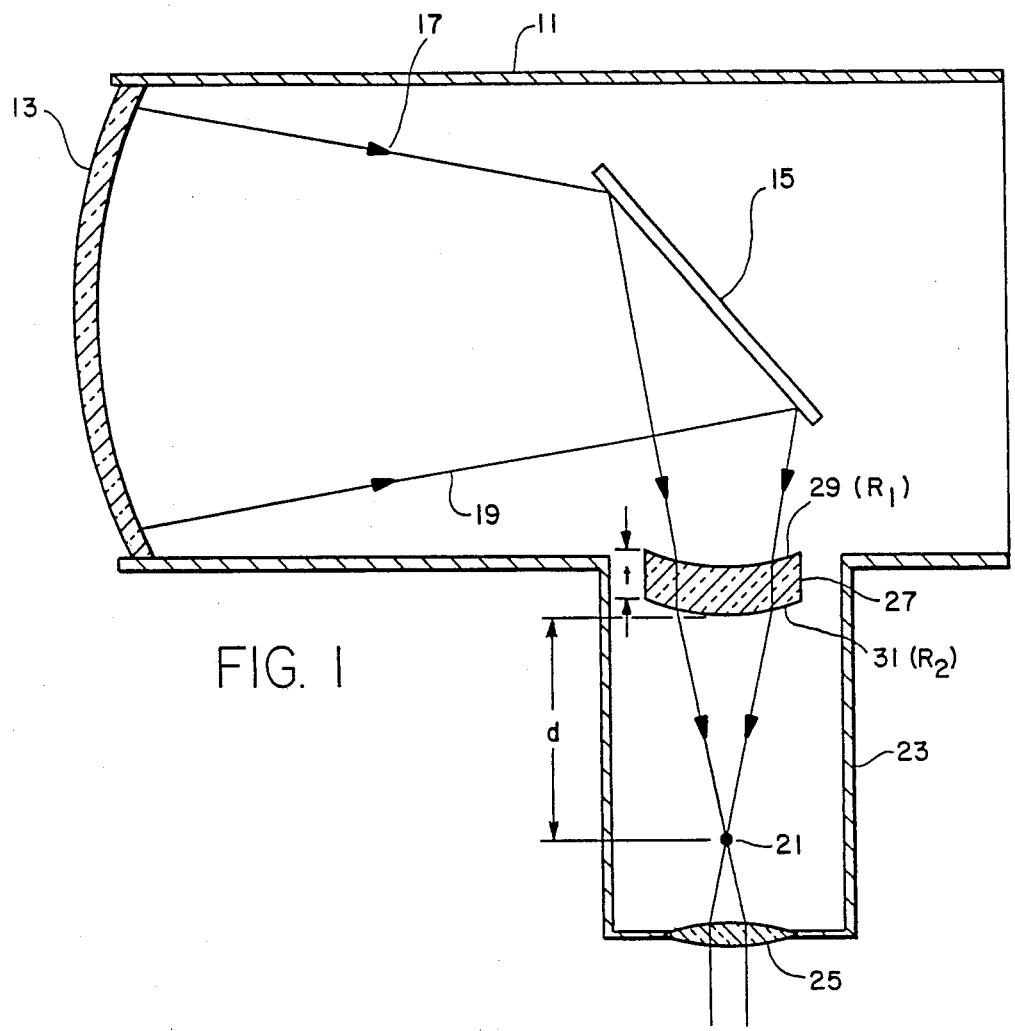
FIG. 1 is a schematic illustration of a telescope utilizing a correcting meniscus lens.

In FIG. 1 there is shown a telescope which may be of the type known as the "Deep Sky Telescope" available from Sky Research in Santa Cruz, Calif. The telescope has a housing tube 11, at the back end of which is mounted a primary reflecting mirror 13 which is preferably a parabolic reflector. For purposes of illustration, parabolic reflector 13 will be taken as having a diameter of 8" and a speed of f/2.9 (which is, in fact, the reflector utilized in the Deep Sky Telescope mentioned above). Incoming parallel light is reflected by mirror 13 back down tube 11 to a plano diagonal secondary mirror 15, as illustrated by a pair of rays 17 and 19. Mirror 15 typically has an elliptical shape with a minor axis of about 2.8". The distance between parabolic reflector 13 and planar reflector 15 is typically about 15". (Note that the various elements shown in the drawings are not necessarily drawn to scale.)

Light reflected from mirror 15 converges to a focal point 21 near the end of a focuser tube 23. With the illustrative parabolic reflector 13 and secondary mirror 15 described above, focus 21 is a distance of about 8.2" from the center of secondary mirror 15.

The image formed at focus 21 may be viewed through an eyepiece 25 such as a 20 mm focal length Erfle eyepiece. Eyepiece 25 is mounted to focuser tube 23 in a manner well known in the art, e.g., in the manner of the Deep Sky Telescope referred to above.

The image formed by telescopes of the type just described is distorted because of numerous aberrations in the optical elements of the system. For example, parabolic reflecting mirrors, especially fast mirrors such as f/3 or faster, exhibit a great deal of coma aberration which gives stars the appearance of a comet, having a long tail extending from a central bright spot. Additionally, the use of eyepieces, such as the Erfle eyepiece described above, in such fast telescopes introduces both coma and spherical aberration into the system, due to the extremely fast light cone entering the eyepiece.

In accordance with the principles of the present invention, it has been found that the coma and spherical aberrations of a fast Newtonian telescope can be eliminated or greatly reduced in a very simple manner by the use of a meniscus correcting lens 27 interposed in the converging rays reflected from mirror 31; by a meniscus lens is meant a lens having front and back surfaces concave in the same direction. In FIG. 1, the faces of lens 27 are concave toward parabolic mirror 13. By selecting the radius of the front surface 29 (hereinafter to be designated "R1") and the lens position to collimate the light within lens 27, various aberrations such as spherical aberration, coma astigmatism, and color are introduced into the system. However, if the radius of back surface 31 of meniscus lens 27 (hereinafter called "R2") is then selected to be equal to R1, both spherical aberration and color introduced by surface 29 will be exactly cancelled when the rays emerge from surface 31 of lens 27. However, the coma introduced by surface 31 will not cancel the coma introduced by front surface 29; the net amount of coma introduced by lens 27 will, in fact, vary linearly with the lens thickness. Furthermore, the coma introduced by meniscus lens 27 is of the opposite and proper sign to permit cancellation of the combined coma of parabolic mirror 13 and eyepiece 25.

The above described system utilizes a meniscus lens which will correct the system for coma of the parabolic mirror and coma of the eyepiece. However the system is left uncorrected for spherical aberration of the eyepiece. In accordance with the principles of the pesent invention however, the same meniscus lens 27 may be utilized to eliminate or greatly reduce the spherical aberration of the eyepiece. This may be simply accomplished by positioning meniscus lens 27 so that light incident on surface 29 is not collimated inside meniscus lens 27. In this case the spherical aberration introduced by back surface 31 will not cancel that introduced by front surface 29, the net spherical aberration of lens 27 thereby being selectable (and of proper sign) to off-set the spherical aberration of eyepiece 25. This enables the same correcting meniscus lens 27 to correct for the spherical aberration and coma of the eyepiece 25, as well as the coma of the parabolic reflector 13.

In this system, according to the invention, it has been found that the field of view, and magnification of the telescope remain substantially unchanged upon introduction of the meniscus corrector in as much as the meniscus is essentially a zero power element simply behaving as a uniformly bent concentric window in this respect. This effect is important to preserve the large field of view desired in fast telescopes. Such a meniscus also preserves the image brightness, which is of special importance for viewing nebulae, galaxies and other deep-sky objects, all viewable by a low f-number, fast telescopes.

Several examples of systems utilizing the principles of the present invention will now be discussed, in which the placement of the meniscus lens will be described in terms of a parameter "d" defined as the distance from rear surface 31 of meniscus lens 27 to the focal point 21 of reflector 13. It has been found that the introduction of meniscus lens 27 into the Newtonian system displaces the focal point toward viewing lens 25 by a distance almost exactly equal to the thickness of the meniscus lens; this displacement is the same (to first order) whether or not the light rays are collimated within the meniscus lens. For convenience, the thickness of the meniscus correcting lens will hereinafter be designated by the symbol "t". All of the various lenses discussed hereinafter are available from Sky Research in Santa Cruz, Calif.

With specific reference to a parabolic reflecting mirror of 8" diameter and speed of f/2.9, and a 25 mm f.l. (focal length) eyepiece, meniscus lens 27 may be selected so that R1=R2=1.75", t=1.0 and d=2.0". With these parameters, correction will be obtained for spherical aberration and coma of eyepiece 25 and coma of parabolic mirror reflector 13. In addition, with proper design of the meniscus corrector eyepieces of other focal lengths, for example ranging from 10 mm to 40 mm or more, may be corrected within the system by using a meniscus mounted on a moveable slide to match its transverse position to the correction required by the eyepiece being used at the moment. For example, the meniscus cited above will give good correction when used with eyepieces ranging from approximately 16 mm f.1 to 32 mm f.1. When the meniscus is positioned by using the slide from about d=3.0″ to d=1.0″. In an alternate embodiment, using the same 8″, f/2.9 primary reflector, the system parameters may be selected as: R1=R2=2.125, t=0.25″ and d=4.25″. With these parameters correcting lens 27 corrects for the coma of parabolic mirror 13, but does not introduce any spherical aberration into the system. Importantly, the meniscus corrector here utilizes a relatively thin configuration to limit astigmatism, and does not require substantially thick cross section as would be required of "Maksutov-type" correctors which must correct the large amounts of spherical aberration produced by the spherical primary mirrors used in the systems discussed by Maksutov; here, the parabolic mirror is completely free of spherical aberration by its nature. This coma correction without introduction of spherical aberration is useful when it is desired to perform prime-focus photography, which is effected by removing eyepiece 25 and positioning a strip of film at focus 21. An advantageous feature of this embodiment is that the displacement of focal point 21 by meniscus lens 27 (described above) provides additional space for positioning of a camera and film approximately at the focal plane of reflector 13.

Figure 2:
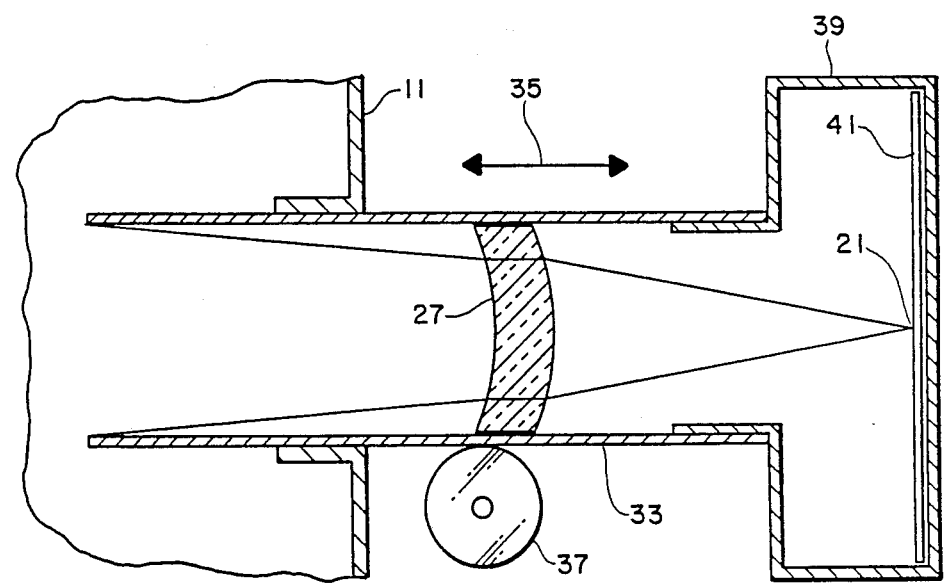
FIG. 2 shows a meniscus lens mounted in a focuser tube for use in prime-focus photography.
Figure 3:
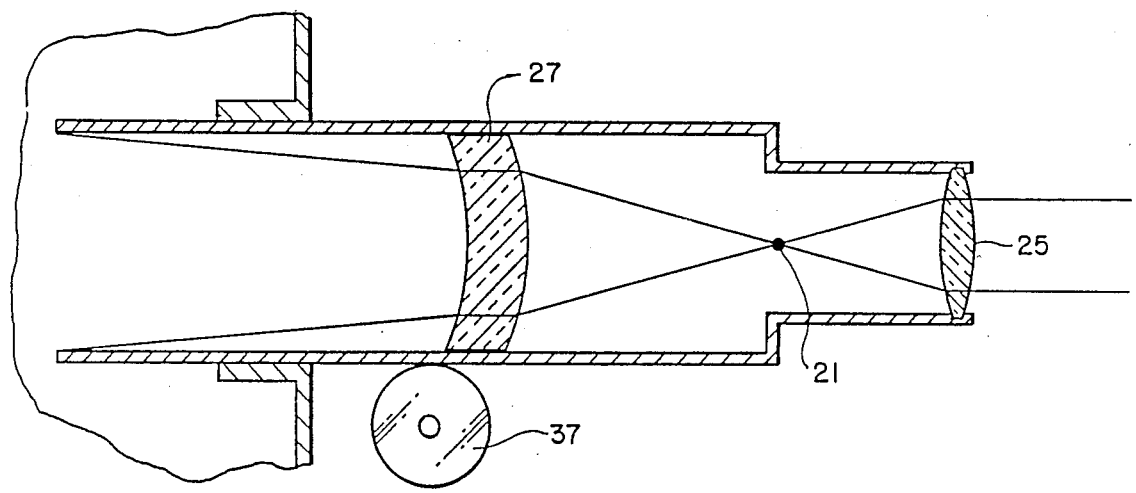
FIG. 3 shows the focuser tube and lens of FIG. 2 in a different position for use with a viewing lens.

In the embodiments of FIGS. 2 and 3 the principles of the invention are advantageously exploited in conjunction with a movable focuser tube which provides a certain amount of travel between the viewing end of the focuser tube and the main telescope tube itself. More particularly a focuser tube 33 is adjustable in the traverse direction indicated by arrows 35 in response to motion of a focuser knob 37. Such a focuser tube is the Model 680 available from Meade Corporation and others, which has approximately a 3″ travel. Meniscus lens 27 is fixed to the interior of focuser tube 33 by use of a suitable lens cell. For prime-focus photography use, a lensless camera 39 is used to position a strip of film 41 in the focal plane of the telescope so that focal point 21 falls on the film. For the particular preferred systems described above meniscus lens 27 should have the parameters R1=2.0″, R2=2.0″, and t=0.5″. In this case focuser tube 33 is the "down" position so that d=3.25″. In the configuration of FIG. 3 focuser tube 33 has been racked to the "up" position carrying meniscus lens 27 closer to the focal point, for example so that d=1.25″. At the same time, camera 39 has been removed and replaced by eyepiece 25, for example of the type described above. It has been found that when meniscus lens 27 is thus moved closer to the focal point, the optical rays are no longer collimated within the meniscus lens, resulting in the introduction of additional coma and also of spherical aberration. For the parameters just described these are of the proper amount and sign to provide useful correction to the system for the spherical aberration and coma introduced by eyepiece 25, as well as for the coma of primary reflector 13. Thus, the same meniscus lens may be advantageously utilized in this system for use with a viewing eyepiece or alternatively for use in accomplishing prime-focus photography. In both cases the system coma (and spherical aberration, if present) are corrected, while introducing only minimal astigmatism since the meniscus thickness is limited.

In the various examples discussed above, the radii R1 and R2 have been taken to be equal. However, it is also possible to utilize meniscus lenses having unequal radii to achieve similar corrections. This freedom is especially useful in cases where it is not possible to vary the lens thickness. However, if the lens position, lens thickness, and image shift are all determined, there are some circumstances where spherical aberration cannot be corrected, regardless of the choice of different lens radii. In such cases, however, one or both of the lens surfaces can be made aspheric, in a manner well known in the art. The resulting reduction of spherical aberration introduced by the meniscus lens then permits the correction for both coma and spherical aberration in the restricted system.

In certain circumstances, the thickness required for meniscus lens 27 to achieve desired aberration corrections may result in a lens which is too costly and/or too heavy. In such circumstances, meniscus lens 27 may be conveniently formed from two separate lenses shown in FIG. 4 as a plano-concave lens 43 and a plano-convex lens 45, positioned with their planar sides parallel. Lens 43 is positioned to achieve collimation of the light rays from the primary reflector after passing through concave surface 29. A desired amount of coma correction and/or image shift may then be achieved by separating the lenses 43 and 45 by the requisite amount. In a practical telescope this is nicely accomplished by fixing lens 43 in the focuser tube, while mounting lens 45 on a moveable slide. The proper position of lens 45 may then be determined by inspection of the image to produce an image exhibiting a minimum amount of coma.

The split meniscus lens technique may be advantageously employed to restrict the size of the diagonal secondary mirror while simultaneously correcting aberrations. This improves system performance by limiting deleterious diffraction and obscuration effects due to the diagonal mirror, and also lessens the cost and weight (size) of the diagonal. This is accomplished, for example, by moving the primary mirror further back in tube 11, e.g. to 19″ separation between primary and secondary mirror, instead of 15″ (as in the prior example). The focal point is now 4.2″ downstream from the diagonal rather than 8.2″ (prior example); and the size required of the diagonal mirror to assure full coverage of f/2.9 light cone is only 1.4″ on the minor diagonal rather than 2.8″, a reduction of 75% in area of the diagional, which also results in equivalent savings in weight and cost. For example, this feature reduces central obstruction of the system to only 3% compared to 12% for the prior system, with concurrent improvement of diffraction effects modulation transfer (MTF) and contrast level at the image. The reduced size of the secondary diagonal mirror also reduces the objectionable "black-spot" defocused image of the secondary mirror, well-known to telescope users.

By placing the plano-concave half of the meniscus corrector approximately 1.25″ inside the focus of reflector 13, and choosing the meniscus radii to be approximately R1=R2=1.5″ to collimate, or nearly collimate, light between the two halves of the corrector; and by separating these halves it is possible to "pipe out" the image position to any desired distance. For example, if the two halves of the meniscus are separated by 4″ within the focuser tube, the image will be brought out to a focus at approximately the same point as in the prior example which required a diagonal size of 2.8″. This technique is especially useful and important as the diameter of primary mirror 13 is increased, for example to 16″ or 24″. Furthermore, the image may be "piped out" in this manner without reducing the field of view of the telescope. Negative achromats, for example, "Barlow Lenses" commonly used for this purpose in the prior art all do so by increasing the effective focal length of the telescope and thereby diminish the field considerably. In addition, these negative lenses, (and also any positive lenses that might be used to relay real images out to the desired displaced focal point) all tend to detract from the image quality rather than to improve it, as is accomplished by virtue of the correction process described herein.

Figure 4:
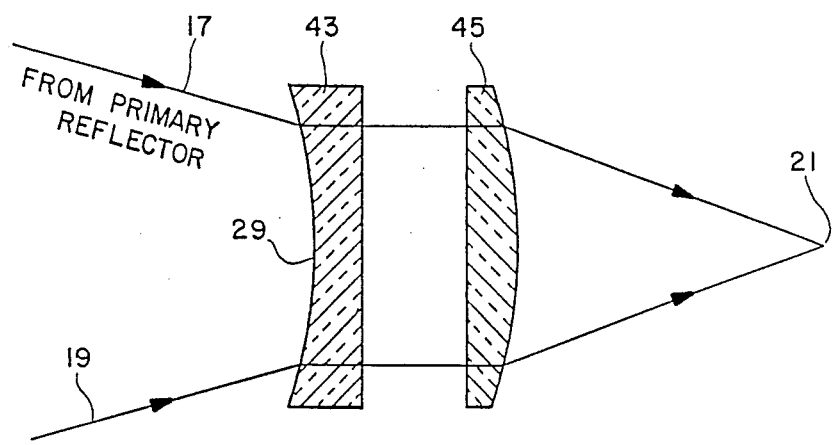
FIG. 4 illustrates the use of a pair of lens to produce the effect of a meniscus lens.
Figure 7:
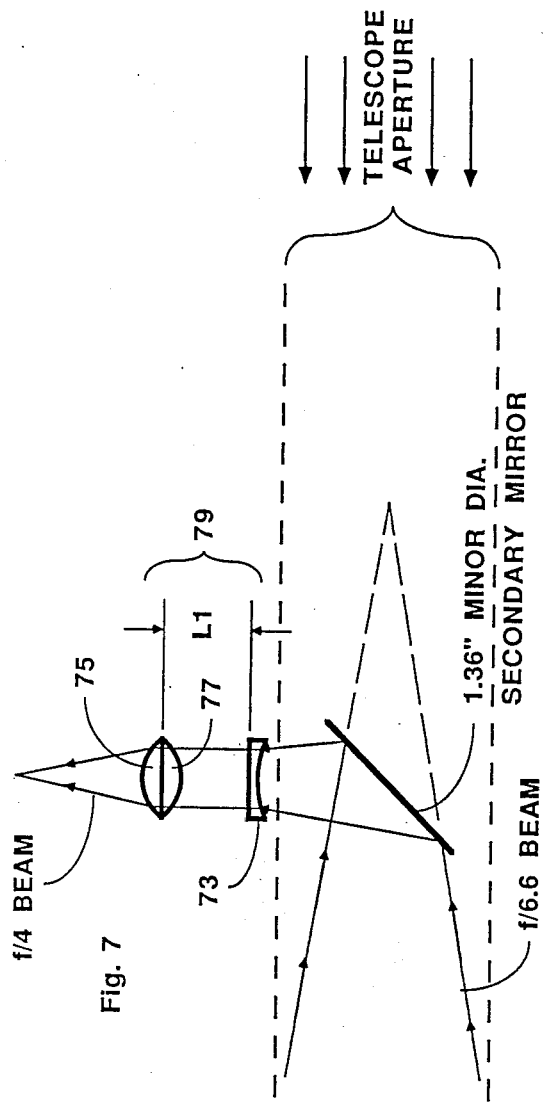
FIG. 7 illustrates another embodiment of the invention where additional power has been added to the corrector assembly over that used in FIG. 6.

In another embodiment, optical power is added to the meniscus lens, to produce a new corrector system illustrated in FIGS. 6 and 7. However, before describing that new system, it is useful to first look at the limitations of the split meniscus telescope corrector system already discussed and which is illustrated in FIG. 5. As a specific example of that system, the telescope will be assumed to be an 8" reflector with an f/3 primary mirror 13, a secondary (plano) mirror 15, and a split meniscus corrector lens 59 made up of a plano-concave lens 43 and a plano-convex lens 45 as shown in FIG. 4, with lenses 43 and 45 each having an index of refraction n=1.5 (it will be assumed throughout the balance of the discussion that the index of refraction for all lenses is about 1.5). The focal length for such a system without the corrector assembly 59 is 24" (ie., 8"×3). If an ocular having a 1.0" focal length is used, the field of view will be 2.38 degrees (ie., Arctan 1/24). If the plano-concave lens 43 is chosen to have a 6.0" meniscus radius and is placed about 6.0" inches upstream of the focal point (without the corrector), with its concave surface toward the secondary mirror 15, the light will be roughly collimated (to within a few degrees) as it leaves the meniscus lens 43. In practice, this position for lens 43 is typically at the very bottom of the focuser tube, and so as not to vignet the f/3 light cone, lens 43 is typically a 2.0" inch diameter lens fitted into a focuser tube having a 2.0" internal diameter. In a typical configuration, the plano-convex lens 45 also has a 6.0" meniscus radius and is to be placed a convenient distance L1 from the plano-concave lens 43, say about 2.0" inches, which is one-third of the available distance from the upstream surface to the focal point. Small adjustments in lens position or changes in the radius can be used to bring the system to collimation as accurately as desired.

With the above configuration of FIG. 5, the focal length of the corrector 59 can be calculated using the familiar lens-markers formula:

$$FL_{corr} = \frac{fcc \times fcx}{fcc + fcx - d}$$

where fcc is the focal length of the plano-concave element 43 and fcx is the focal length of the plano-convex element 45, and d is the separation therebetween.

Given the orientations of lenses 43 and 45, fcc=−12 and fcx=+12. So, $$FL_{corr} = \frac{-12 \times 12}{-12 + 12 - 2} = 72''$$

which is three times the focal length of the primary mirror 13. The combination of the primary mirror together with the corrector, calculated using the above techniques, then provides a combined focal length of 22.5".

With this system, coma and spherical aberration can be corrected as indicated earlier, but there are several drawbacks to the design. First, the corrector assembly 59 extends into the telescope aperture, and secondly, the corrector elements themselves have substantial diameter. Although not a detriment caused by the corrector assembly 59, the already short focal length is not significantly shorter (22.5" versus 24" so that the field of view is substantially the same) and the necessarily large central obscuration caused by the secondary (plano) mirror 15 due to the fast light cone of the primary mirror 13 remains unchanged. There is a benefit, however, in that the corrector assembly 59 lifts the focal point (ie., increases the back focus), in this case by approximately two inches.

For slower telescopes, the benefits of the zero power corrector assembly 59 are considerably less dramatic, since the effects of coma and spherical aberration are already significantly reduced. For example, for an 8" f/6.6 primary mirror and a correspondingly longer focal length of 52.8", with the same configuration of corrector assembly 59, with lens 43 placed 5" inches from the focal point (without the corrector), the focal length of the telescope together with corrector assembly is $$FL = \frac{52.8 \times 72}{52.8 + 72 - 47.8} = 49.4''$$

Again, the focal length is not significantly reduced so the field is substantially unchanged and the image quality is only slightly enhanced.

However, by adding power to the corrector assembly, very significant enhancement can be achieved for both the field of view and image quality. For example, for a system as illustrated in FIG. 6, with a corrector assembly 69 having a plano-concave lens 73 with a radius of −7.0" placed 5.0" from the focal point of the primary mirror and a plano-convex lens 75 having a convex radius of 5.0" placed a distance L1=2.0" from lens 73, the focal length of the corrector will be $$FL_{corr} = \frac{-14 \times 10}{-14 + 10 - 2} = 23.33''$$

Using this corrector 69 with an 8", f/6.6 primary mirror 63 (not shown) results in a focal length for the telescope of $$FL_{tele} = \frac{52.8 \times 23.33}{52.8 + 23.33 - 47.8} = 43.5''$$

This is a significant change in f/No. for the telescope, since this corresponds to f/5.4(=43.5÷8), and hence a much wider field of view. Also, it can be shown that the system aberrations are well corrected and not much spherical aberration or color has been introduced. Furthermore, the field is extremely flat.

An even wider field (and hence faster system) can be obtained by adding even more power to the corrector assembly 69. Generally, adding more power will introduce noticeable spherical aberration and color to the image. However, similar to the situation with a zero power meniscus corrector, repositioning of the corrector toward the focal point can correct these additional aberrations which are introduced. As an example, consider the system shown in FIG. 7, which is identical to that of FIG. 6, except that additional power has bee added to the corrector assembly 69, by adding another plano-convex lens 77 in contact with lens 75 and of equal power to it to provide a bi-convex lens having a radius of 5.0" on each side. Also the entire assembly has been moved approximately 1.0" toward the focal point of the primary mirror to correct for the aberrations introduced by the additional power, ie., the lens 73 is now only about 4" from the focal point of the primary mirror. In this example, the power of the negative lens 73 has been left unchanged in order to preserve the corrector in a configuration with nearly collimated light between the elements, in order that the process of repositioning can compensate for the added aberrations introduced. In this configuration the focal length of the corrector assembly 79 is $$FL_{corr} = \frac{-14 \times 5}{-14 + 5 - 2} = 6.36''$$

and the focal length of the telescope with corrector is $$FL_{tele} = \frac{52.8 \times 6.36}{52.8 + 6.36 - 48.8} = 32.4''$$

This corresponds to a system of approximately f/4 (32.4÷8), which when used with a 1.0" focal length ocular corresponds to a field of view of 1.77 degrees. Similar results can be obtained by simply increasing the power of the plano-convex lens 75, rather than using the bi-convex design.

With the powered corrector 79 appropriately placed along the optic axis, a much faster telescope can be obtained which has excellent correction for aberrations, with the surprising result that astigmatism is completely eliminated also, and again the field is extremely flat. Essentially the telescope can have two modes of operation. The first mode without the corrector, at f/6.6 which is quite satisfactory for viewing and photographing bright close-by objects such as those in the solar system, and the second mode with the powered corrector inserted which converts the telescope to one suitable for viewing and photographing deep sky objects such as nebulae, galaxies, constellations, and comets. In this second f/4 mode, the area of the field of view is enhanced more than three times that of the f/6.6 mode, and similarly the image brightness is increased nearly three times as well. Another benefit of the powered corrector is that with a little attention to lens thickness the final focal point in the wide field mode is found to be nearly in the same location as when the corrector is removed. This is quite a convenience, since unlike the typical situation with fast telescopes, back focus distance is not a problem when using an f/6.6 primary mirror. Also, the position of the corrector assembly is higher so that it no longer obscures the telescope aperture.

A further very important feature of using the powered corrector to obtain a wide field is that the diagonal mirror 15 for the f/4 configuration with the corrector is the same as that used for the f/6.6 mode. Hence, the central obscuration is very small (only 1.36" mirror axis diameter) as compared to the typical obscuration required for an f/4 Newtonian telescope without the corrector. The reason is that all the light from the primary objective is collected and the size of the secondary mirror does not affect the field of view at all. The central obscuration ratio is therefore only 15% of the diameter of the objective in either the f/4 mode or the f/6.6 mode. Thus the modulation transfer function of the telescope at all spatial frequencies will closely approach that of a 1/5 wave unobscured instrument, the diameter of the secondary mirror being only approximately 60% of that of a standard f/4 configuration.

Another advantage of adding power to the meniscus corrector to obtain a wide field instrument is that the diameter of the lens elements are much reduced compared to the zero power meniscus corrector. The f/6.6 light cone entering the powered corrector, before the conversion to f/4, is only 0.75" (5.0"÷6.6"). Thus the corrector will fit quite easily into a standard 1¼" or 0.965" focuser tube.

Probably the most significant and visually striking feature of this powered corrector 79, however, is that it greatly increases image contrast ratio. This becomes readily apparent when the powered corrector assembly 79 is used with a large aperature, very fast primary mirror. To illustrate the point, consider a 12½" diameter paraboidal primary of f/2.9, using elements in corrector assembly 79 which are 2.0" in diameter, with the corrector placed 3.0" inches forward of the original focal point of the primary mirror.

The system focal length is $$FL_{tele} = \frac{36.25 \times 6.36}{36.25 + 6.36 - 33.25} = 24.63''$$

which corresponds to f/1.97 or approximately f/2. Along with this increase in speed, the image as before is simultaneously improved by the correction of coma and spherical aberration, and also surprisingly astigmatism is again completely eliminated. Furthermore, any residual aberration of the image that may remain is made physically smaller by the reduction in focal length, quite apart from the aberration correction that occurs. (See, *The Infrared Handbook*, Wolfe and Zissis, Eds., Sec. 9.1.2., Office of Naval Research, Washington D.C., 1978).

Therefore, residual aberrations are decreased by about 68% (24.63÷36.25). In addition to the dual reduction in aberrations, an important increase in image brightness is achieved, which for extended objects is determined by the reciprocal ratio of the squares of the f/No.'s, ie. the brightness increases=

$$\frac{(2.9)^2}{(2.0)^2} = 2.1.$$

The increase in contrast for any object, ie. increase in signal-to-noise ratio, is also determined by the reciprocal of the ratios of the f/No.'s, ie.

$$\text{signal-to-noise (SNR)} \, \alpha \, \frac{1}{f/No.}$$

for an aberration free system. Hence, the improvement in signal-to-noise ratio $I_{SNR}$, as a result of decreasing the f/No. is $$I_{SNR} = \frac{SNR \text{ (with no corrector)}}{SNR \text{ (with corrector)}} = 1.45$$

in an aberration free system, or a nearly 50% increase. Furthermore, this is only a conservative estimate since the system aberrations have also been corrected, leading to an even higher enhancement of signal-to-noise ratio.

A further important result of using the powered corrector for fast systems (>f/4), is that it permits the entire bundle of light entering the telescope to enter the eye of the observer. In the typical telescope, there is an aperture stop at the primary objective which defines the entrance pupil. The exit pupil is then the image of the objective formed by the eyepiece. For the powered corrector, however, the aperture stop and entrance pupil appears to be the upstream element of the corrector assembly, ie. the plano-concave lens 73. This has the important result of reducing the bundle size which enters the eye, while preserving all the light that entered the telescope. The practical effect is that larger focal length eyepieces having significantly less field curvature can be used, and the exit bundle will still be small enough for all of it to enter the human eye. This is in stark contrast to the typical situation with large aperture systems without the powered corrector where short focal length oculars must be used which introduce severe field curvature and result in unpleasant imagery.

Those skilled in the art will also realize that there are other significant benefits of using the powered corrector as compared to systems used in the prior art for increasing the field of view. Such prior art systems have consisted of focal reducers, commonly available items being single positive lenses or achromats. As an example, such elements might typically be used in combination with Schmidt Cassegrain telescopes of about f/10 focal ratio, which typically reduces the focal ratio to about f/5. However, in these systems, the reducer lenses always introduce undesirable spherical aberration and often color into the system. Also the system is frequently vignetted.

Figure 8:
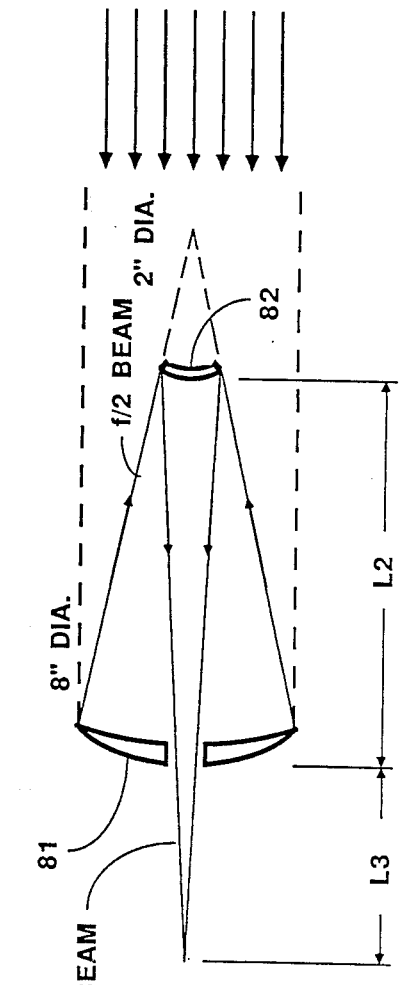
FIG. 8 shows a standard prior art design for a Cassegrain telescope.

One drawback to obtaining a wide field Newtonian telescope system using the powered corrector is that even though the focal length is considerably shortened by use of the powered corrector, the length of the tube used is still that of the longer focal length system. In the art, one approach to avoid the long tube associated with the Newtonian design is to use folded optics such as those associated with the Cassegrain designs. The corrector assemblies according to the invention can be used equally well in those designs and in fact in any design which presents a nominally spherical wave to the corrector. Not only that, the significant benefits which can be obtained by use of the corrector in Newtonian systems are even more dramatic in the Cassegrain systems, primarily because the presently used approaches in the art for increasing the field of view of these systems are so poor by comparison. As an example, shown in FIG. 8 is a typical f/11 Cassegrain design, which can be in the Schmidt, Classical, Maksutov, or other configurations, as long as the objective system presents a nominally spherical wave at the location of the focuser tube.

In this system, the primary mirror 81 is an f/2 mirror, 8.0" in diameter, and the secondary mirror 82 is 2.0" in diameter located at a separation of L2=12" from the primary mirror 81. With this system, the focal length is 88" (8"×11), the secondary amplification is 5.5x (11÷2), and the back focus L3 is 10". In addition the secondary obscuration is 0.25 (2÷8), so that the modulation transfer function at all spacial frequencies closely approaches that of a ¼ wave unobstructed telescope system.

To produce a faster system, f/5.5 for example, using the same primary mirror 81 would require increasing the secondary mirror diameter to 4.0", resulting in a central obscuration ratio of 0.5 (4÷8), which would be unacceptably large and result in a very poor modulation transfer (ie., signal-to-noise ratio). Furthermore, those skilled in the art are aware that this problem is generally endemic to standard Cassegrain designs faster than about f/8. In addition, such designs often suffer from having a back focus distance which is too short.

Figure 9:
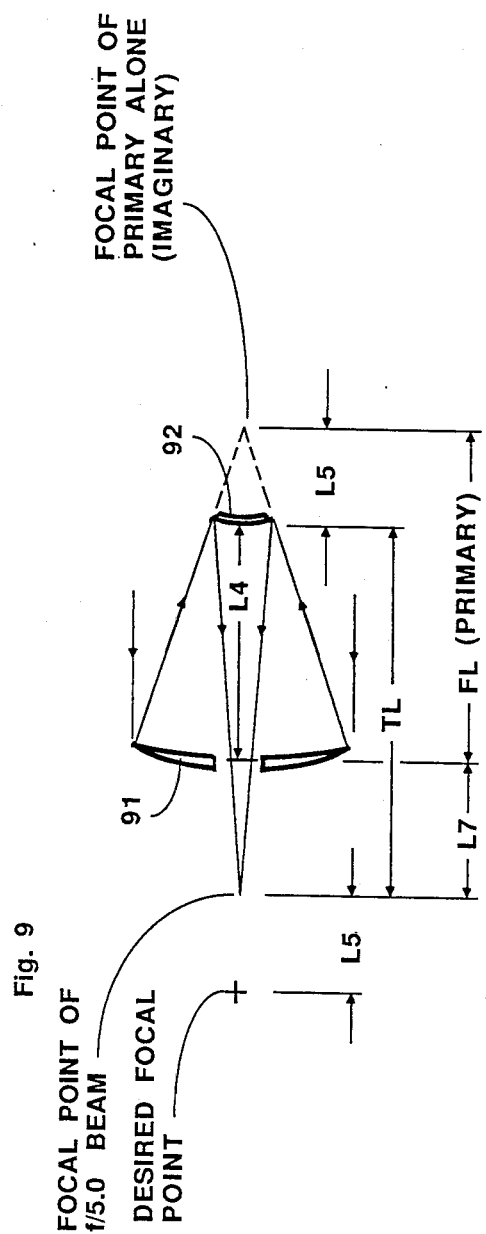
FIG. 9 shows a wide field Cassegrain telescope illustrating typical difficulties encountered with such systems.
Figure 10:
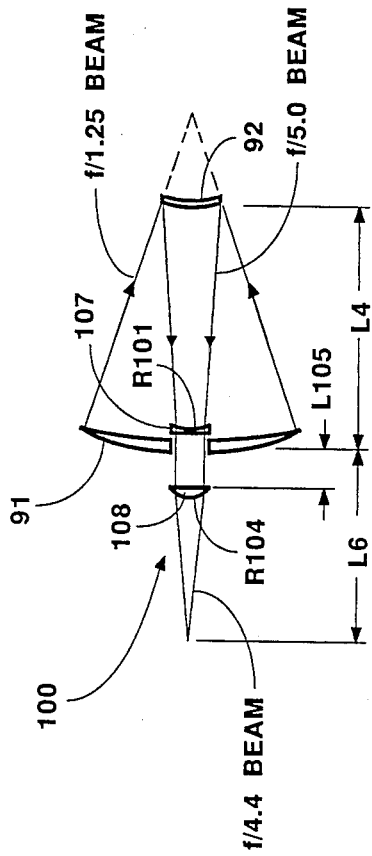
FIG. 10 illustrates a telescope of Cassegrain design using the zero-power corrector assembly.

A corrector according to the invention can be used to advantage in Cassegrain systems, however, to produce good correction at f/4 to f/5, and to extend the back focus. To illustrate this, shown in FIG. 9 is an 8" diameter f/5.0 Cassegrain telescope. The primary mirror 91 is 8" in diameter having a focal ratio of f/1.25. The secondary mirror 92 is 2.5" in diameter (L5÷1.25 where L5=3.75"), the secondary amplification is 4X (5÷1.25), and the secondary obscuration is 0.31 (2.5÷8). Although this secondary obscuration is acceptable, and the resulting tube length TL of 12.5" is extremely short, the resulting back focus L7=6.25" is too short for most applications. A corrector 100 according to the invention can, however, be used to retain this extremely compact configuration and to extend the back focus. Such a configuration is shown in FIG. 10, which uses a split meniscus lens 100 having two components, 107 a plano-concave lens and 108, a plano-convex lens with radii R104 and R101 of approximately 6" on the convex and concave surfaces. The preferred location of the corrector is approximately 6" upstream of the original Cassegrain focal point, in order to very nearly collimate the light between the lenses, which places a portion of the corrector within the baffle tube in the primary mirror 91. By choosing a separation L105 between the lenses of 3.0" and a total glass thickness for the corrector of 0.75, the back focus is changed approximately 3.75", which corresponds to a total back focus L6 of 10", a distance quite acceptable for most uses. The focal length of corrector 100 is approximately:

$$FL_{corr} = \frac{-12 \times 12}{-12 + 12 - 3} = 48''.$$

Hence the focal length of the Cassegrain telescope with corrector is:

$$FL_{tele} = \frac{40 \times 48}{40 + 48 - 33.75} = 35.4'';$$

and the focal ratio is f/4.4 (=35.4÷8).

Hence the resulting telescope not only has a more useable back focus distance, but it is also slightly faster.

Figure 11:
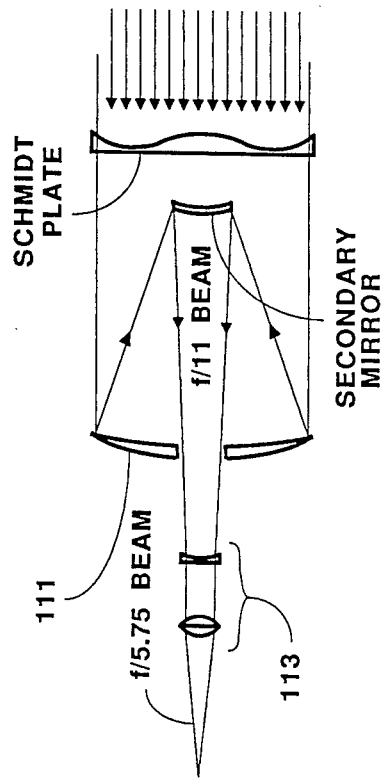
FIG. 11 illustrates a telescope of the Schmidt-Cassegrain design using a wide field (non-zero power) corrector.

In addition to the above special application for achieving a somewhat wider field with a Cassegrain design, a wide field, or powered, corrector is even more useful in many applications than the corrector with zero power, in that the image brightness of standard types of Cassegrain configurations can be considerably increased, as well as achieving an even wider field of view. Shown in FIG. 11 is a standard Schmidt Cassegrain telescope (although any Cassegrain or even refractor could be used as an example), having a focal ratio of f/11 and an 8" primary mirror 111, so that the focal length of the primary is 88". A wide field (powered) corrector 113 such as that used in FIG. 7 is placed at an optical distance of 82.25" from the primary mirror 111, to nearly collimate the light between the lenses of the corrector. Since the focal length of the corrector is 6.36" as described earlier, the focal length of the telescope and corrector together is:

$$FL_{tele} = \frac{88 \times 6.36}{88 + 6.36 - 82.25} = 46.2''$$

For this 8" system, the corresponding focal ratio is 5.75 (46.2÷8), which is much faster than the original f/11 design. Also, with attention to elemental lens thickness, the focal point with the corrector in the optical path is very close to the original position without the corrector. In this particular embodiment, the typical starting design would be to place the corrector 113 at a distance of 82.0" downstream from the primary mirror to collimate the light between the corrector lens elements. Then, since the spherical aberration introduced by the slow f/11 beam is rather small, the corrector is repositioned only 0.25" further downstream to compensate for that spherical aberration, rather than the 1" to 2" typically required of faster telescopes. With this design, the field of view of the Schmidt Cassegrain is nearly twice that of the telescope without the corrector and the image brightness is increased by over a factor of 3 $((11)^e \div (5.75)^e \cong 3.67$ times the original brightness). Thus, the image provided by this corrected telescope is very bright, unvignetted, and aberration minimized, and far surpasses the images available with prior art devices such as focal reducers.

What is claimed is:

1. A telescope comprising:
   a housing;
   image means at one end of said housing for forming a focused image of light incident on said telescope; and
   a meniscus lens having a concave surface and a convex surface placed along an optical path of said telescope to receive light from said image means, said meniscus lens having a positive power and located to correct spherical aberration and coma in said image produced by said image means by collimating said light between said concave surface and said convex surface.

2. A corrector assembly for use in a telescope having an image producing element for forming a focused image of light incident on said telescope, comprising:
   a meniscus lens with positive power; and
   holding means for holding said meniscus lens on an optical path of said telescope at a location where spherical aberration and coma of said focused image are corrected by said meniscus lens, by substantially collimating said light within said meniscus lens.

3. An optical assembly for use with a telescope havin an image forming element for forming an image, comprising:
   a meniscus lens with positive power having a concave refracting surface and a convex refracting surface; and
   holding means for holding said concave refracting surface at a first position on an optic axis of said telescope and for holding said convex refracting surface at a second position on said optic axis such that rays of light from said said image forming element are substantially parallel between sid concave and convex refracting surfaces and such that spherical aberration caused by said image forming element and spherical aberration introduced by said meniscus lens are removed from said image.

4. A method of increasing width of field, image brightness, and image contrast ratio and reducing astigmatism in a telescope having an image forming element for forming an image comprising the step of:
   introducing a positive power meniscus lens having a concave refracting surface and a convex refracting surface into an optical path of said telscope such that light from said image forming element is substantially collimated between said concave surface and said convex surface.

* * * * *